United States Patent [19]
Ito et al.

[11] Patent Number: 5,390,042
[45] Date of Patent: Feb. 14, 1995

[54] HIGH SENSITIVITY OPTICAL RECEIVER SUITABLE FOR SINGLE OPTICAL SIGNAL WITH HIGH SPEED MODULATION

[75] Inventors: Fumihiko Ito; Kenichi Kitayama, both of Kanagawa, Japan

[73] Assignee: Nippon Telegraph and Telephone Corp., Tokyo, Japan

[21] Appl. No.: 205,897

[22] Filed: Mar. 3, 1994

[30] Foreign Application Priority Data

Mar. 8, 1993 [JP] Japan ................................ 5-046923
Mar. 10, 1993 [JP] Japan ................................ 5-049461

[51] Int. Cl.6 ...................... H04B 10/06; G01B 9/02
[52] U.S. Cl. ................................... 359/189; 359/158; 356/345; 364/576
[58] Field of Search ............... 359/183, 189, 190-194, 359/158, 162; 356/345; 364/576

[56] References Cited

U.S. PATENT DOCUMENTS 4,790,655 12/1988 Yamamoto et al. ............. 356/345
4,950,880 8/1990 Hayner ............................ 250/201.9

FOREIGN PATENT DOCUMENTS 0307960 3/1989 European Pat. Off. ............. 359/190
319174A 6/1989 European Pat. Off. .
395060A 10/1990 European Pat. Off. .
2643730 8/1990 France ................................ 356/345

OTHER PUBLICATIONS

Article from Optics Communications, dated Nov. 1, 1985, entitled "A Simple Monitoring System for Single Subpicosend Laser Pluses Using an SH Spatial Autocorrelation Method and a CCD Image Sensor", by Yuzo Ishida and Tatsuo Yajima.

Primary Examiner—Herbert Goldstein
Assistant Examiner—Kinfe-Michael Negash
Attorney, Agent, or Firm—Allegretti & Witcoff, Ltd.

[57] ABSTRACT

An optical receiver for receiving tile optical signals with high speed modulation at a high sensitivity. In this optical receiver, a local beam synchronized with a carrier of the optical signal is generated, and multi-frequency local beam components obtained from the local beam are spatially resolved to obtain spatially resolved beams with mutually different frequencies. Then, the optical signal and the obtained spatially resolved beams are entered into the photo-detector element array simultaneously to obtain an interference fringe pattern. The received optical signal is then reconstructed by Fourier analyzing the interference fringe pattern obtained by the photo-detector element array.

16 Claims, 8 Drawing Sheets

HIGH SENSITIVITY OPTICAL RECEIVER SUITABLE FOR SINGLE OPTICAL SIGNAL WITH HIGH SPEED MODULATION

BACKGROUND OF THE INVENTION

1. Field of the Invention

The present invention relates to an optical receiver for receiving optical signals with high speed modulation in an optical communication system.

2. Description of the Background Art

A conventionally known optical receiver adopts a direct detection scheme to convert the optical signals directly into the electric signals by means of a photo-detector element such as a photo-diode. Consequently, in a conventional optical receiver, the bandwidth of the receivable optical signals is limited to the bandwidth of the photo-detector element.

In this regard, although the homodyne detection scheme used in a coherent optical communication can improve the reception sensitivity in comparison with the direct detection scheme mentioned above, in this homodyne detection scheme, the bandwidth of the receivable optical signals is similarly limited to that of the bandwidth of the photo-detector element or the bandwidth of the other element such as a discrimination circuit for processing the electric signals obtained by the photo-detector element.

Consequently, the conventional optical receiver has a limited response speed, and it has conventionally been quite difficult both technically as well as economically to realize an optical receiver capable of receiving the optical signals with high speed modulation in forms of the so called optical cells or optical packets for carrying a finite bit-sequence within a finite temporal length T.

More specifically, one example of a conventional ultrashort light pulse measurement device is disclosed in Y. Ishida et al., "Self-Phase Modulation in Hybridly Mode-Locked CW Dye Lasers", IEEE Journal of Quantum Electronics, Vol. QE-21, No. 1, Jan. 1985, pp. 69-17, which has a schematic configuration as shown in FIG. 1.

In this conventional device of FIG. 1, the ultrashort light pulse is split by a half mirror 101 into two parts, and one of which is reflected by a fixed mirror 102 while another one of which is reflected by a movable mirror 103 to give a variable delay. These two parts of the ultrashort light pulse are then focused by a lens 104 to a KDP crystal for generating a second harmonic. At this point, due to the variable delay given at the movable mirror 103, there is a time difference between the arrival times of the two parts. The second harmonic generated at the KDP crystal is then entered into a monochromator 108 through a filter 106 and a lens 107, so as to observe the resulting spectrum while varying the variable delay. The original ultrashort light pulse can then be reconstructed from the observed spectrum of the second harmonic.

However, this conventional device of FIG. 1 is associated with the problem that it is only applicable to the light pulses that can be generated stably for a number of times repeatedly, because it is necessary to observe the spectrum of the second harmonic while varying the variable delay.

In addition, this conventional device of FIG. 1 is also associated with the problem that it requires a relatively large light pulse optical power (normally over 0.1 to 1 W) because of its use of the second harmonic generation which is the nonlinear optical phenomenon.

Because of these problems, it is quite difficult to utilize this conventional device of FIG. 1 for a highly sensitive reception of a single optical signal, and in particular, it is highly implausible to consider its application to the optical communication system.

On the other hand, another example of a conventional ultrashort light pulse measurement device is disclosed in Y. Ishida et al., "A Simple Monitoring System for Single Subpicosecond Laser Pulses using an SH Spatial Autocorrelation Method and a CCD Image Sensor", Optics Communications, Vol. 56, No. 1, November 1985, pp. 60, which has a schematic configuration as shown in FIG. 2.

In this conventional device of FIG. 2, the ultrashort light pulse is split into two parts, and the spectrum of the second harmonic is observed as a function of pulse arrival time difference, Just as in the conventional device of FIG. 1 described above. Namely, the ultrashort light pulse is split into two parts by a half mirror 111 and lead to a KDP crystal 113 by a mirror 112-1 and 112-2 on one hand and by a mirror 112-3 on the other hand via different routes having different path lengths, so as to give the time difference between the arrival times for two parts. Then, the second harmonic generated at the KDP crystal 113 is entered into a monochromator 115 through a filter 114, so as to observe the resulting spectrum. The original ultrashort light pulse can then be reconstructed from the observed spectrum of the second harmonic.

This conventional device of FIG. 2 has an advantage over the conventional device of FIG. 1 in that the pulse arrival time difference is produced by the different routes for two split parts of the ultrashort light pulse to pass through, so that there is no need to mechanically vary the variable delay as in the conventional device of FIG. 1, and consequently it is possible to deal with a single optical signal, without requiring the light pulses to be generated stably for a number of times repeatedly.

However, this conventional device of FIG. 2 is also associated with the problem that it requires a relatively large light pulse optical power because of its use of the second harmonic generation which is the nonlinear optical phenomenon, Just as in thee conventional device of FIG. 1 described above.

Consequently, it is still difficult to utilize this conventional device of FIG. 2 for a highly sensitive reception of a single optical signal in the optical communication system.

SUMMARY OF THE INVENTION

It is therefore an object of the present invention to provide an optical receiver which is suitable for receiving the optical signals with high speed modulation, by using low speed electric circuits alone.

It is another object of the present invention to provide an optical receiver capable of receiving a single optical signal in an optical communication at a high sensitivity, without relying on the nonlinear optical phenomenon.

According to one aspect of the present invention there is provided an optical receiver for receiving an optical signal carrying data within a finite temporal length T, comprising: input means for entering the optical signal; local beam generation means for generating a local beam synchronized with a carrier of the optical signal entered by the input means; local beam processing means for obtaining multi-frequency local beam components from the local beam generated by the local beam generation means and spatially resolving the multi-frequency local beam components to obtain spatially resolved beams with mutually different frequencies; photo-detector means for receiving the optical signal entered by the input means and the spatially resolved beams obtained by the local beam processing means simultaneously to obtain an interference fringe pattern; and analyzer means for reconstructing the optical signal by Fourier analyzing the interference fringe pattern obtained by the photo-detector means.

According to another aspect of the present invention there is provided a method of optical reception for receiving an optical signal carrying data within a finite temporal length T, comprising the steps of: (a) entering the optical signal; (b) generating a local beam synchronized with a carrier of the optical signal; (c) obtaining multi-frequency local beam components from the local beam generated at the step (b) and spatially resolving the multi-frequency local beam components to obtain spatially resolved beams with mutually different frequencies; (d) receiving the optical signal entered at the step (a) and the spatially resolved beams obtained at the step (c) simultaneously at photo-detector means to obtain an interference fringe pattern; and (e) reconstructing the optical signal by Fourier analyzing the interference fringe pattern obtained by the photo-detector means at the step (d).

Other features and advantages of the present invention will become apparent from the following description taken in conjunction with the accompanying drawings.

DETAILED DESCRIPTION OF THE PREFERRED EMBODIMENTS

Figure 1:
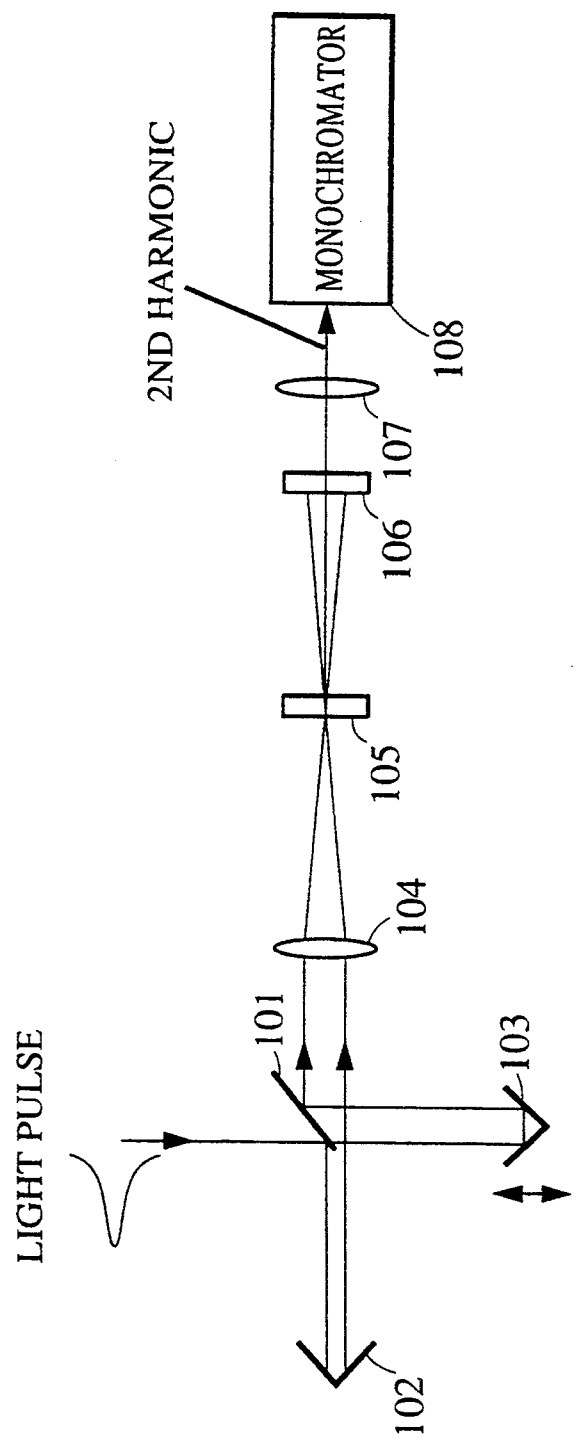
FIG. 1 is a schematic block diagram of one example of a conventional ultrashort light pulse measurement device.
Figure 2:
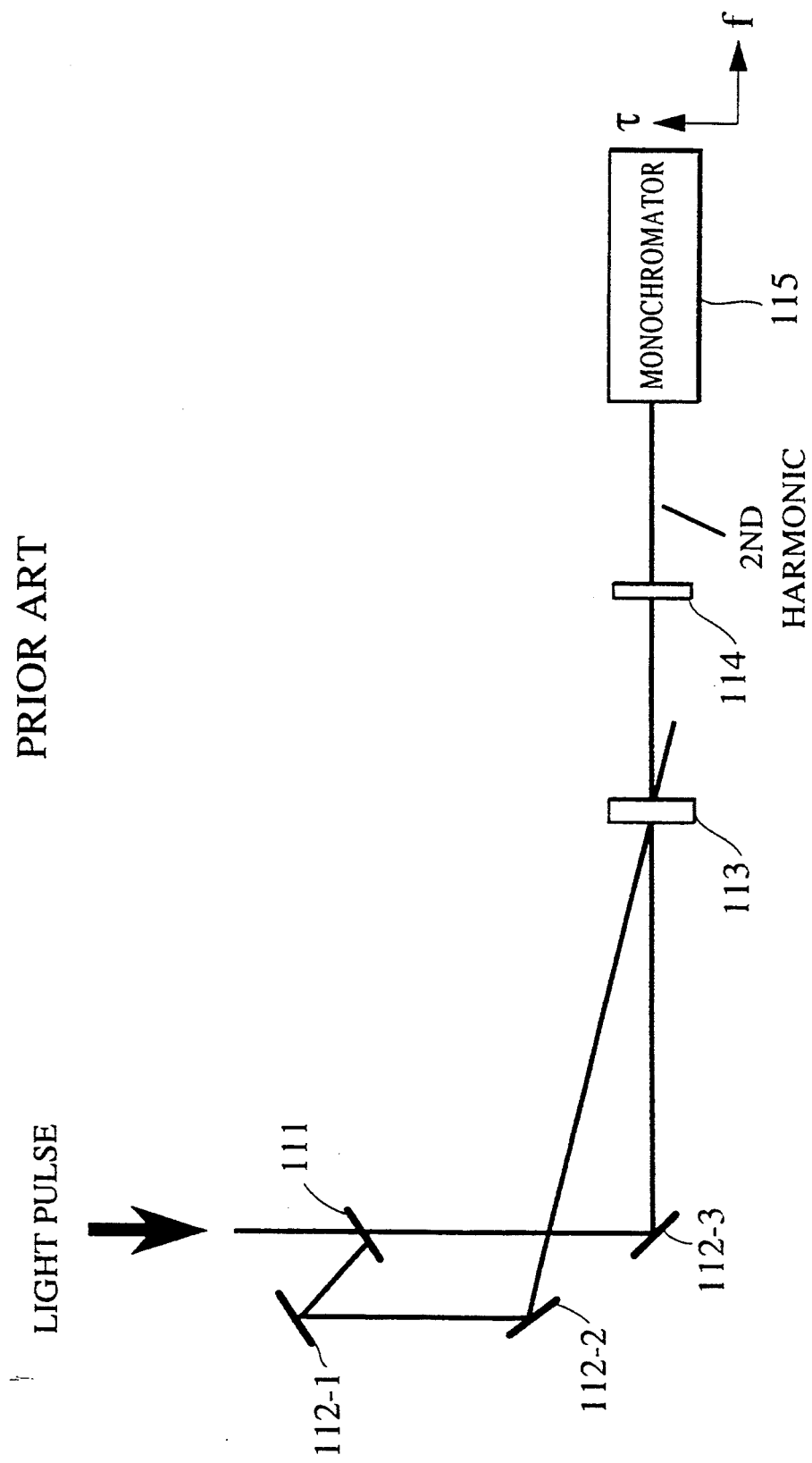
FIG. 2 is a schematic block diagram of another example of a conventional ultrashort light pulse measurement device.
Figure 3:
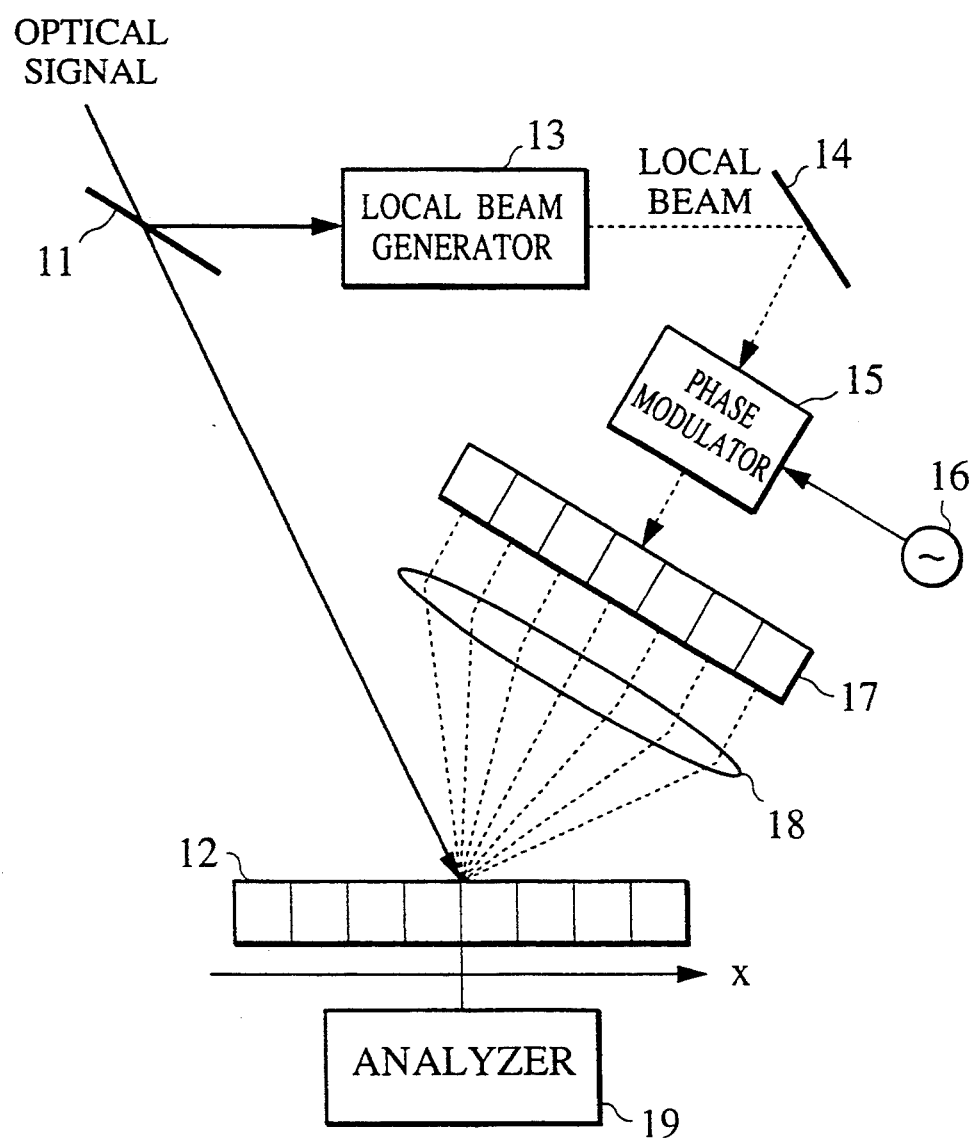
FIG. 3 is a block diagram of a first embodiment of an optical receiver according to the present invention.
Figure 4:
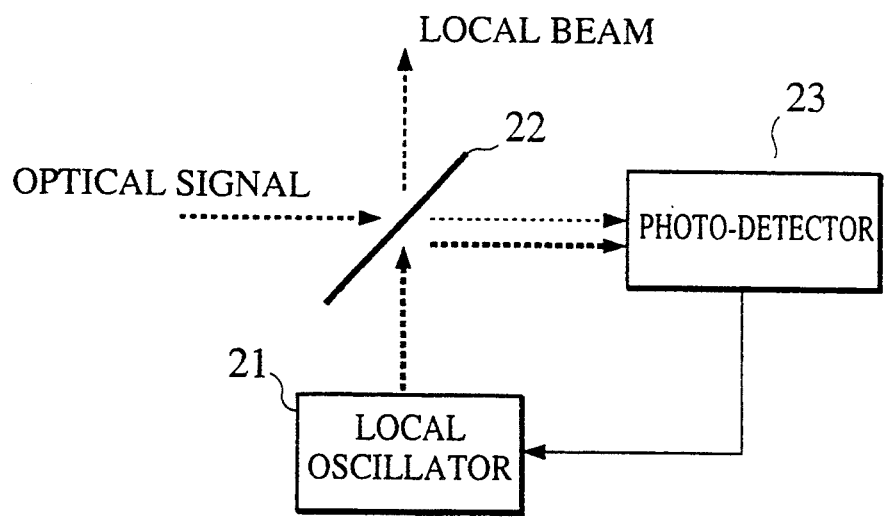
FIG. 4 is a block diagram of a local beam generator in the optical receiver of FIG. 3.
Figure 5:
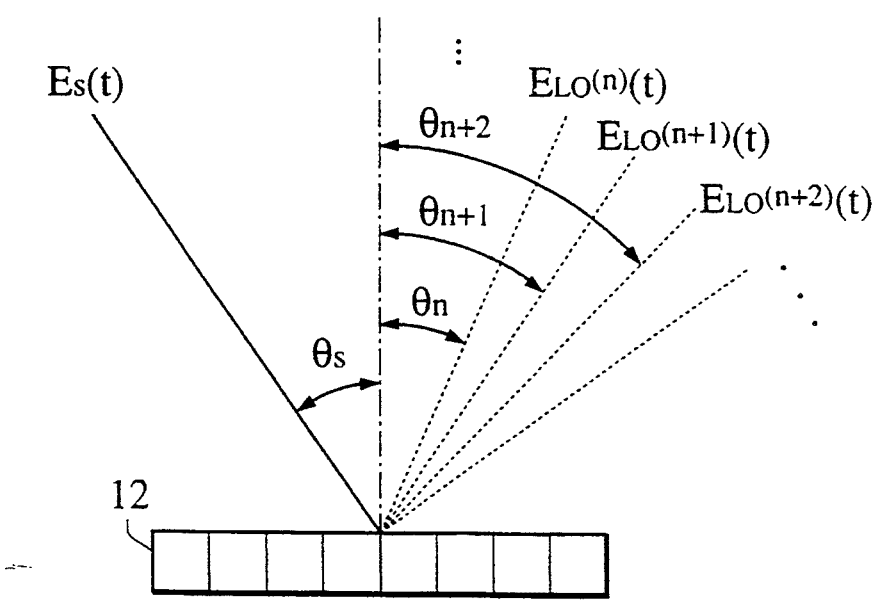
FIG. 5 is a diagrammatic illustration for explaining the operation of the optical receiver of FIG. 3.

Referring now to FIG. 3 to FIG. 5, the first embodiment of the optical receiver according to the present invention will be described in detail.

In this first embodiment, the optical receiver has an overall configuration as shown in FIG. 3 which comprises: a half mirror 11 for splitting an externally entered optical signal into two; a photo-detector element array 12 for receiving one of the split optical signal; a local beam generator 13 for generating a local beam in correspondence to another one of the split optical signal; a mirror 14 for reflecting the local beam generated by tile local beam generator 13; a phase modulator 15 for applying a phase modulation to the local beam reflected by the mirror 14; a reference frequency signal generator 16 for supplying a reference frequency signal to the phase modulator 15; an optical frequency filter 17 for spatially resolving frequency components of the phase modulated local beam obtained by the phase modulator 15; a lens 18 for focusing the spatially resolved frequency components obtained by the optical frequency filter 17 onto the photo-detector element array 12 such that the different frequency components are irradiated onto the photo-detector element array 12 at different incident angles, so as to form an interference fringe pattern thereon; and an analyzer 19 for applying the Fourier analysis to the interference fringe pattern formed on the photo-detector element array 12 to reconstruct the optical signal.

In this first embodiment, the optical signal is given in a form of an optical cell for carrying a finite bit-sequence within a finite temporal length T, which is modulated by the 2N+1 bits NRZ (Non-Return-to-Zero) code. This optical signal can be expressed as the temporal waveform $E_s(t)$ obtained by the superimposition of the sinusoidal waves with discrete frequencies, as in the following equation (1).

$$E_S(t) = \sum_{m=0}^{\pm N} a_m \exp[j\{2\pi(f_0 + m\Delta f)t - k_m x + \phi_m\}] + c.c. \quad (1)$$

where x is a spatial coordinate along the photo-detector element array 12 as shown in FIG. 3, $f_0$ is an optical carrier frequency of the optical signal, $a_m$ is an amplitude of an m-th spectral component, $\phi_m$ is a phase of an m-th spectral component, km is a wave number vector of an m-th spectral component, and $\Delta f = 1/T$. Also, "c.c." of the second term on the right hand side represents the complex conjugate of the first term on the right hand side.

The local beam generator 13 which receives this optical signal expressed by the equation (1) has a detailed configuration as shown in FIG. 4. In this first embodiment, this local beam generator 13 can be equivalent to that used for the conventional homodyne detection in the coherent optical communication.

In the configuration of FIG. 4, the local beam generator 13 comprises a local oscillator 21 such as a multi-electrode semiconductor laser for generating output beam whose oscillation frequency and phase can be adjusted according a driving current; a half mirror 22 for combining the entered optical signal and a part of the output beam generated by the local oscillator 21, while transmitting a remaining part of the output beam as the local beam; and a photo-detector 23 for receiving the combined optical signal and output beam from the half mirror 22 and supplying a beat frequency signal of the combined optical signal and output beam as a feedback to the local oscillator 21. The local oscillator 21 then controls its driving current to make the beat frequency signal fed back from the photo-detector 23 to be zero such that its output beam intensity becomes maximum. In this manner, this local beam generator 13 obtains the local beam which is synchronized with the carrier of the optical signal.

Here, the local beam generated by this local beam generator 13 can be expressed as the temporal waveform $E_{LO}(t)$ given by the following equation (2).

$$E_{LO}(t) = \sum_{n=0}^{\pm \infty} b_n \exp[j\{2\pi(f_0 + n\Delta f)t + (n\pi/2)\}] \quad (2)$$

where
$$b_n = J_n(p) \quad (3)$$

$J_n(P)$ is an n-th degree Bessel function of the first kind, and p is a modulation level.

It is to be noted here however that only the local beam components corresponding to tile bandwidth of the optical signal are actually needed, so that it actually suffices for the variable n in the above equations (2) and (3) to be $-N \leq n \leq N$, and therefore the number of local beam components required for the observation of the 2N+1 bits NRZ optical cell is going to be 2N+1.

The local beam generated by this local beam generator 13 is then phase modulated at the phase modulator 15 by using the reference frequency signal supplied from the reference frequency signal generator 16, where the reference frequency signal represents a sinusoidal wave with a frequency less than or equal to the frequency $\Delta f$ which is most preferably equal to $\Delta f$, and the phase modulated local beam is entered into the optical frequency filter 17.

This optical frequency filter 17 functions to spatially resolve a number of frequency components of the phase modulated local beam as expressed by the above equation (2). Namely, the output at the n-th port of the optical frequency filter 17 has the temporal waveform $E_{LO}{}^{(n)}(t)$ expressed by the following equation (4).

$$E_{LO}{}^{(n)}(t) = b_n \exp[j\{2\Delta(f_0 + n\Delta f)t + (n\pi/2)\}] \quad (4)$$

The spatially resolved frequency components $E_{LO}{}^{(n)}(t)$ of the local beam outputted from the optical frequency filter 17 are then focused onto the photo-detector element array 12 by the lens 18 such that the different frequency components are irradiated onto the photo-detector element array 12 at different incident angles. Here, for the sake of explanation, the incident angles of the frequency components of the local beam and the optical signal with respect to the photo-detector element array 12 are set as shown in FIG. 5, i.e., the optical signal $E_s(t)$ has the incident angle $\theta_s$, the n-th frequency component $E_{LO}{}^{(n)}(t)$ of the local beam has the incident angle $\theta_n$, etc.

When the optical signal and the local beam are made to be simultaneously incident on the photo-detector element array 12 by appropriately adjusting the respective path lengths, these optical signal and local beam interfere with each other and produces an interference fringe pattern on a plane of the photo-detector element array 12. Here, the interference fringe pattern K(x) on the photo-detector element array 12 can be expressed by the following equation (5).

$$K(x) = \sum_{n=0}^{\pm N} a_n b_n \exp[j\{K_n x + \phi_n - (n\pi/2)\}] \quad (5)$$

where $K_n$ is a period of the interference fringe, which can be expressed as:

$$K_n = \frac{4\pi \sin[(\theta_s - \theta_n)/2] \cos[(\theta_s + \theta_n)/2]}{\lambda} \quad (6)$$

where $\lambda$ is a wavelength of the light.

The above equation (5) implies that, on the plane of the photo-detector element array 12, it is possible to observe the interference fringe pattern obtained by combining 2N+1 sinusoidal waves of different periods. This interference fringe pattern is a complicated one in general, but by the Fourier analysis of the observed pattern, it is possible to calculate the amplitude and phase of the sinusoidal wave having the period $K_n$. Namely, the values of $a_n b_n$ and $(\phi_n - n\pi/2)$ in the equation (5) can be determined by the Fourier transform, but $b_n$ and $n\pi/2$ have the known values, so that an and the $\phi_n$ can be determined. Then, by substituting the obtained amplitude and phase into the expression for the temporal waveform $E_s(t)$ of the original optical signal given by the above equation (1), it is possible to reconstruct the original optical signal (optical cell). In this manner, the analyzer 19 reconstructs the optical signal from the interference fringe pattern formed on the photo-detector element array 12.

In this first embodiment, the spatially resolved frequency components of the phase modulated local beam are utilized, so that it suffices for the phase modulator 15 to have the response speed equal to $1/(2N+1)$ of the bit rate of the optical cell. Also, the photo-current distribution is observed in a form of the interference fringe pattern on the photo-detector element array 12, so that it suffices for the photo-detector element array 12 to be operated at a rate lower than the modulation bit rate of the optical signal.

Thus, in the optical receiver of this first embodiment, it is possible to receive the optical signal with high speed modulation by using only the devices of rather limited bandwidths, i.e., the optical cell modulated at a certain bit rate can be received by using only-the low speed electric circuits having the bandwidths much lower than the modulation bit rate of that optical cell.

Consequently, it is possible for the optical receiver of this first embodiment to receive the single high speed optical signal at the sensitivity much higher than the conventionally realizable level, and therefore it is suitable for receiving the optical cell or optical packet for carrying the finite bit-sequence within a finite temporal length T. In particular, the optical receiver of this first embodiment can be expected to be useful in the ATM (Asynchronous Transfer Mode) communication scheme in which the optical cell is used as a minimum unit of the communication signal.

It is to be noted here that the modulation of the optical signal by the NRZ code in the first embodiment described may be replaced by the modulation by the other codes such as the RZ (Return-to-Zero) code.

It is also to be noted that the optical receiver of this first embodiment is not Just applicable to the digital optical signals as described above, but also applicable to analog optical signals.

Referring now to FIG. 6 to FIG. 9, the second embodiment of the optical receiver according to the present invention will be described in detail. Here, those elements which are equivalent to the corresponding elements in the first embodiment described above will be given the same reference numerals in the drawings and their detailed description will be omitted.

Figure 6:
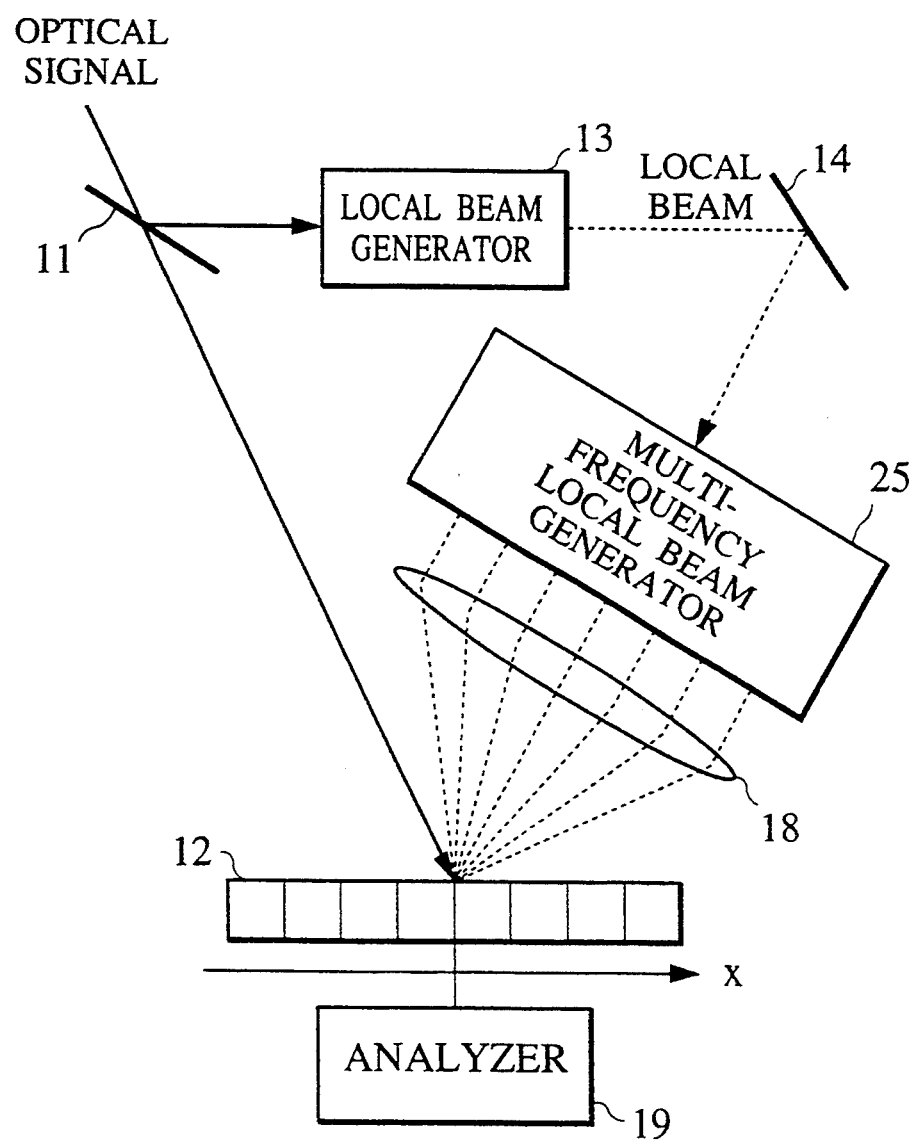
FIG. 6 is a block diagram of a second embodiment of an optical receiver according to the present invention.

In this second embodiment, the optical receiver has an overall configuration as shown in FIG. 6, which differs from that shown FIG. 3 for the first embodiment in that a multi-frequency local beam generator 25 replaces the phase modulator 15, the reference frequency signal generator 16, and the optical frequency filter 17 used in the first embodiment described above. The rest of this configuration of FIG. 6 is substantially equivalent to that of FIG. 3.

Here, the multi-frequency local beam generator 25 has a function to generate the spatially resolved multi-frequency local beams, each of which is sequentially shifted by Δf from the immediately preceding one, from the local beam generated by the local beam generator 13, and irradiating the obtained multi-frequency local beams onto the photo-detector element array 12 through the lens 18.

Thus, in this second embodiment, the optical frequency filter used in the first embodiment which is required to have a high frequency resolution becomes unnecessary, so that it becomes possible to fix the frequency interval Δf at a high precision by using the simpler system, and consequently it becomes possible to realize the optical receiver according to the present invention at the reduced cost and the improved reliability.

Figure 7:
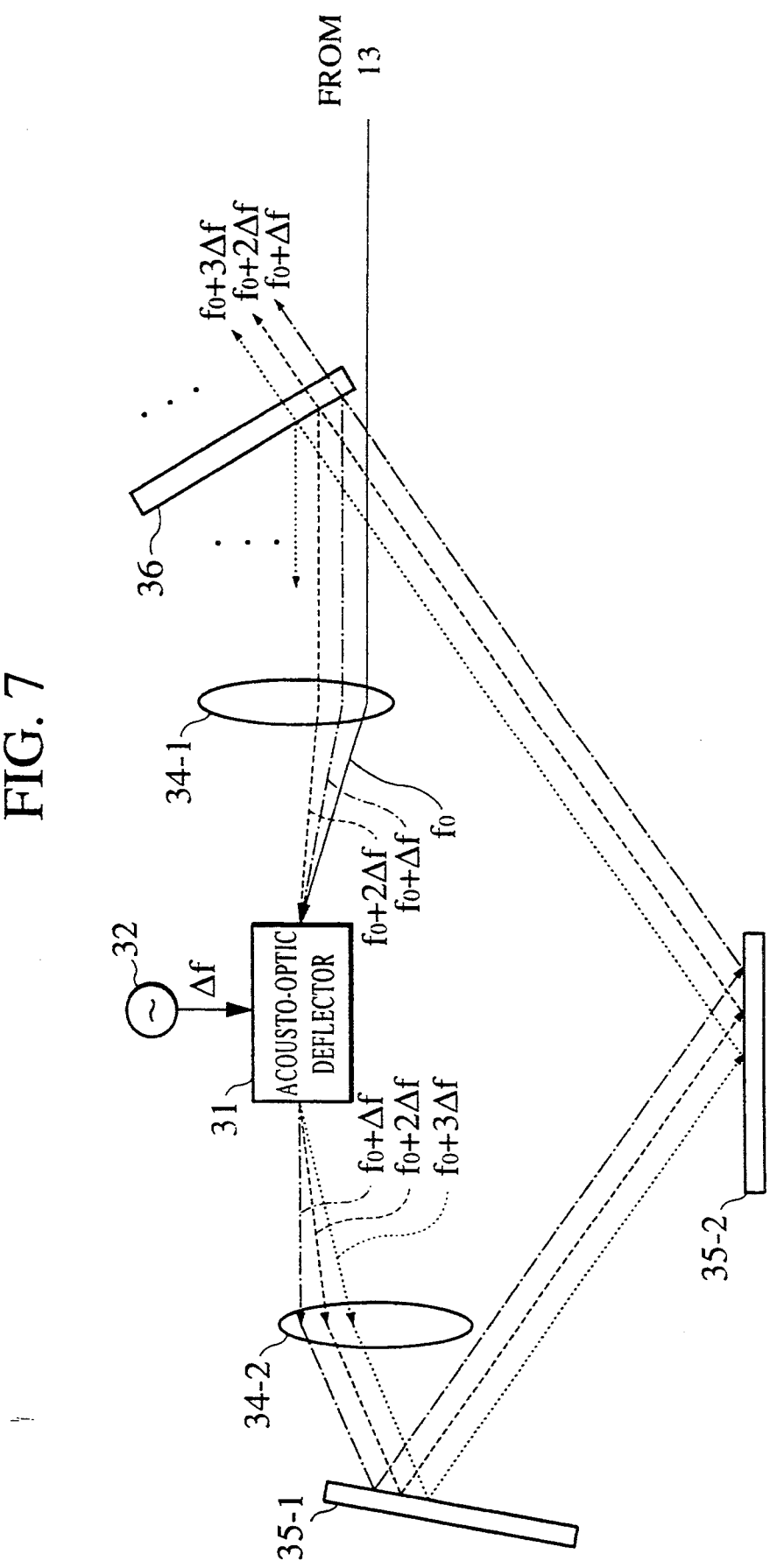
FIG. 7 is a block diagram of a multi-frequency local beam generator in the optical receiver of FIG. 6.

More specifically, the multi-frequency local beam generator 25 of this second embodiment has a detailed configuration as shown in FIG. 7, which comprises: a lens 34-1 for giving a prescribed incident angle to the local beam with the frequency $f_0$ entered from the local beam generator 13; an acousto-optic deflector 31 for shifting the frequency of the local beam entered from the local beam generator 13 through the lens 34-1 at the prescribed incident angle by Δf and outputting the local beam with a shifted frequency $(f_0+\Delta f)$ at an output angle in which a prescribed deflection angle is added to the incident angle; a sinusoidal wave generator 32 for supplying sinusoidal wave signals with tile frequency Δf to the acousto-optic deflector 31; a lens 34-2 for making the frequency shifted local beam outputted from the acousto-optic deflector 31 to be parallel with respect to an output beam path; mirrors 35-1 and 35-2 for guiding the parallel frequency shifted local beam to the output beam path; and a half mirror 36 located at the output beam path, for transmitting a part of the parallel frequency shifted local beam guided by the mirrors 35-1 and 35-2 as the output local beam , while reflecting a remaining part of the parallel frequency shifted local beam toward the acousto-optic deflector 31 through the lens 34-1. Here, the half mirror 36 is positioned such that the reflected local beam with the frequency $(f_0+\Delta f)$ will have an incident angle slightly shifted from that of the original local beam with the frequency $f_0$.

Thus, in this configuration of FIG. 7, a beam path is formed by the lenses 34-1 and 34-2, the mirrors 35-1 and 35-2, and the half mirror 36, to circulate the local beam around, where the incident angle of the local beam with respect to the acousto-optic deflector 31 is sequentially shifted in each circulation. Consequently, the local beam with the frequency $(f_0+i\Delta f)$ coming out from the acoust-optic deflector 31 is going to be propagated through a beam path different from that of the local beam with the frequency $(f0+(i-1)\Delta f)$ from which it originated, where i is an integer between 1 and N corresponding to a number of circulations of the local beam , and outputted through the half mirror 36 from the output beam path which is spatially distanced from that of the previous circulation. Therefore, this multi-frequency local beam generator 25 can obtain N spatially resolved local beams having N different frequencies with a frequency interval Δf between adjacent ones, which are equivalent to the output of the optical frequency filter 17 of the first embodiment described above.

Figure 8:
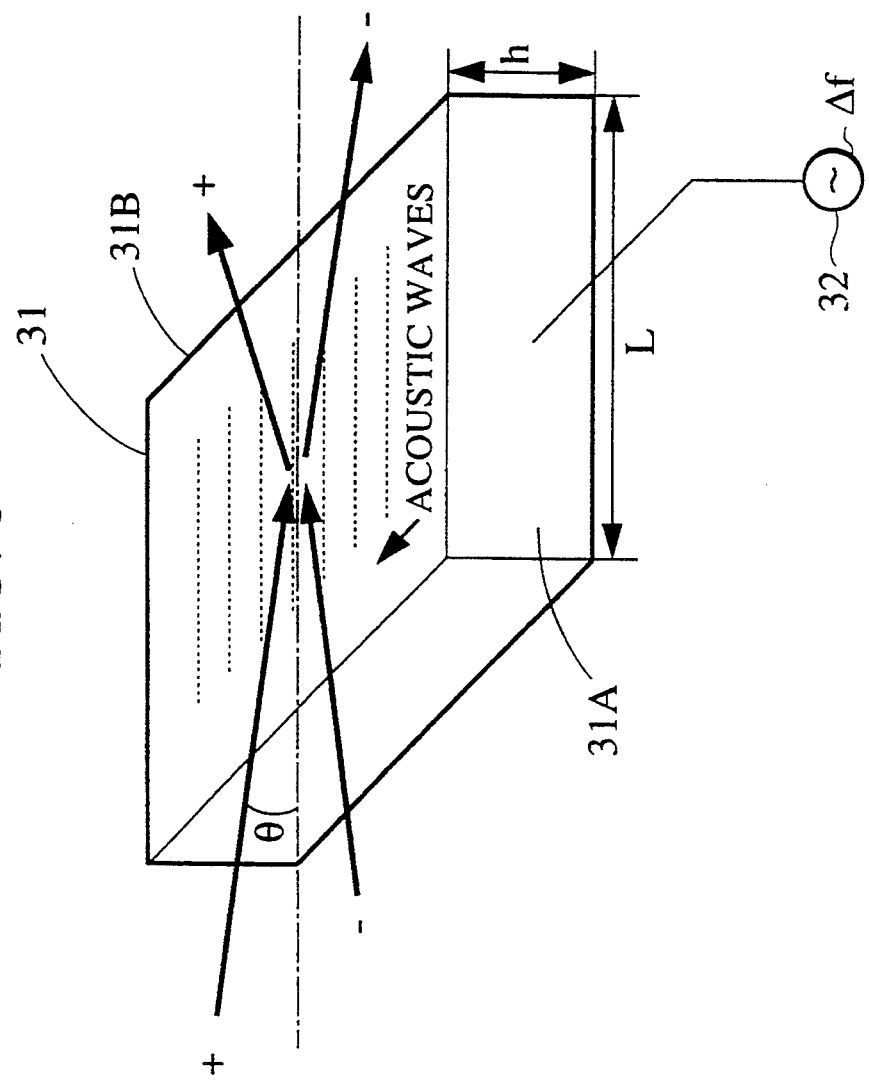
FIG. 8 is a perspective view of an acousto-optic deflector in the multi-frequency local beam generator of FIG. 7.

Here, the acousto-optic deflector 31 has a configuration as shown in FIG. 8 which comprises a transducer 31A for generating acoustic waves by converting the sinusoidal wave signals supplied from the sinusoidal wave generator 32 into mechanical vibrations, and a solid body 31B having an acousto-optic property and a longitudinal cross sectional size of h×L.

In this configuration of FIG. 8, the sinusoidal wave signals with the frequency Δf are converted into the acoustic waves of the same frequency by the transducer 31A, and the generated acoustic waves are propagated through the solid body 31B in a transverse direction as indicated in FIG. 8. When the local beam is externally entered along a longitudinal direction into this solid body 31B propagating the acoustic waves, the frequency and the propagation direction of the local beam are changed from an input side to an output side.

In this acousto-optic deflector 31, in order to obtain the significant output, the incident angle θ of the local beam with respect to the solid body 31B must satisfy the following equation (7) which is known as the Bragg condition.

$$2v\sin\theta/\Delta f = \pm\lambda \tag{7}$$

where v is a speed of the acoustic waves within the solid body 31B, and λ is the wavelength of the incident local beam. Here, the incident local beam can be entered either from a positive transverse side in which a direction of the transverse component of the local beam opposes the propagation direction of the acoustic waves, or from a negative transverse side in which a direction of the transverse component of the local beam coincides with propagation direction of the acoustic waves. The output local beam frequency $f_{out}$ of the acousto-optic deflector 31 can be expressed in terms of the input local beam frequency $f_{in}$ by the following equation (8).

$$f_{out}=f_{in}\pm\Delta f \tag{8}$$

where + sign is to be used for the incident local beam from the positive transverse side while - sign is to be used for the incident local beam from the negative transverse side. Thus, depending on the incident direction, the input frequency $f_{in}$ of the incident local beam can be increased or decreased by the frequency Δf of the sinusoidal wave signals, as described above.

It is to be noted here that, in the configuration of FIG. 7, the position to supply the local beam from the local beam generator 13 may be changed from that in front of the lens 34-1 as shown in FIG. 7 to that in front of the lens 34-2 in which case the first local beam to be outputted to the output beam path is going to have the frequency equal to $f_0$. Also, the positions of the mirrors 35-1 and 35-2 and the half mirror 36 may be interchanged to direct the output beam path into a different direction.

Now, in the multi-frequency local beam generator 25 of this second embodiment, the frequency shifted local beam is going to be fed back to the acousto-optic deflector 31 repeatedly by means of the half mirror 36, in order to obtain a number of frequency components with sequentially shifted frequencies. Here, however, the half mirror 36 must split the circulated local beam into the output local beam and the local beam to be fed back to the acousto-optic deflector 31, so that the optical power of the output local beam is gradually diminished as the frequency is shifted further, and consequently there is a limit to a number of frequency shifted local beams that can be obtained at a sufficient optical power level by this multi-frequency local beam generator 25.

More specifically, the optical power $P_n$, of the local beam with the frequency ($f_0+n'\Delta f$) can be expressed as the following equation (9).

$$P_n' = P_0 \eta^{n'} R^{\bar{n}-1} T \qquad (9)$$

where $P_0$ is the output power of the local beam generator 13, $\eta$ is a diffraction efficiency of the acousto-optic deflector 31, and R and T are the reflectivity and the transmittivity of the half mirror 36, respectively. Thus, according to this equation (9), the maximum number $n_{max}$ (corresponding to the maximum frequency shift $n_{max}\Delta f$) for guaranteeing the required optical power P can be determined as the following equation (10).

$$n_{max} = 1 + \frac{\log(P/P_0\eta T)}{\log(\eta R)} \qquad (10)$$

Conversely, the appropriate values of $P_0$, $\eta$, R and T for guaranteeing the required number $n_{max}$ and the required optical power P can be determined.

On the other hand, in the multi-frequency local beam generator 25 of this second embodiment, the incident angle of the frequency shifted local beam fed back to the acousto-optic deflector 31 is sequentially shifted in each circulation, in order to spatially resolve the output local beams with different frequencies. Here, however, in order to achieve the efficient diffraction in the acousto-optic deflector 31, it is necessary to keep the incident angle of the incident local beam within a prescribed range, and when the spread of the local beam is taken into consideration, there is going to be a limit to a maximum number of output local beams that can be spatially resolved in this multi-frequency local beam generator 25.

More specifically, the tolerable incident angle deviation $\delta\theta$ of the acousto-optic deflector 31 can be expressed by the following equation (11).

$$\delta\theta \approx (v/\Delta i f)/L \qquad (11)$$

where $v/\Delta f$ indicates the wavelength of the acoustic waves within the solid body 31B, and L is a length of the solid body 31B in the longitudinal direction indicating an interaction length for the acoustic waves and the local beam.

On the other hand, the spread angle $\Delta\theta$ of the local beam can be expressed by the following equation (12).

$$\Delta\theta = 2\lambda/\pi m'\omega_0 \qquad (12)$$

where m' is a refractive index of the acousto-optic deflector 31, and $\omega_0$ is the local beam diameter within the acousto-optic deflector 31.

Consequently, the maximum number $N_{max}$ of output local beams that can be spatially resolved in this multi-frequency local beam generator 25 is given by the following equation (13).

$$N_{max}\delta\theta/\Delta\theta = \pi m' v \omega_0/2\lambda L \Delta f \qquad (13)$$

For example, in a case of using the GaAs acousto-optic deflector having m'=3.4 and v=5.2×10³ (m/s), with the conditions of $\omega_0$=5 (mm), $\lambda$=5.5 ($\mu$m), L=1 (mm), and $\Delta f$ =1 (GHz), the maximum number $N_{max}$ is going to be about 90. This maximum number $N_{max}$ realizable in this second embodiment is much larger than a number of frequencies to be multiplexed in the conventionally available frequency multiplexing optical communication system which is usually about 10 to 20.

Thus, in the multi-frequency local beam generator 25 of this second embodiment, the number off output local beams is set to be the smaller one of the maximum number $n_{max}$ obtained according to the above equation (10) and the maximum number $N_{max}$ obtained according to the above equation (13), and the positions of the optical systems such as the half mirror 36 are optimally adjusted to satisfy the tolerable incident angle deviation $\delta\theta$ for all of the output local beams.

It is to be noted here however that only the local beam components corresponding to the bandwidth of the optical signal are actually needed, so that it actually suffices to obtain N output local beams by the multi-frequency local beam generator 25, where $N \leq N_{max}$ as well as $N \leq n_{max}$.

Also, the driving power Q of the acousto-optic deflector 31 necessary for achieving the diffraction efficiency $\eta$=100% can be expressed by the following equation (14) according to the theory for diffraction of the light by the acoustic waves.

$$Q = (\lambda^2 \cos^2 \theta_B/2M) \cdot (h/L) \qquad (14)$$

where h is a height of the transducer 31A so that h/L indicates an aspect ratio of the transducer 31A, M is a figure of merit determined by the material of the solid body 31B, and $\theta_B$ is a deflection angle which can be expressed by the following equation (15).

$$\theta_B = \lambda \Delta f/2m'v \qquad (15)$$

Here, the figure of merit M is equal to $1.04 \times 10^{-13}$ in a case of using GaAs, and the aspect ratio h/L of about 1/10 can be easily realized by the present-day ordinary manufacturing technique. It can be seen from the above equation (14) that it is possible to reduce the driving power Q by reducing this aspect ratio h/L.

For example, by setting the aspect ratio h/L=1/10, the required driving power Q is going to be about 1.2 (W), so that this acousto-optic deflector 31 can be driven by the sinusoidal wave generator 32 with a relatively small output power.

Also, in the multi-frequency local beam generator 25 of this second embodiment, a number of output local beams can be irradiated onto the photo-detector element array 12 simultaneously by making the local beam generator 13 to generate the CW (continuous wave) local beam so as to compensate the time lag between different circulations of the local beam .

It is to be noted here that in order to receive the optical signal by using the multi-frequency local beams with the frequencies $f_0$ to $f_0+n\Delta f$, it is necessary for the optical signal to be modulated by either the amplitude modulation or the phase modulation.

Figure 9:
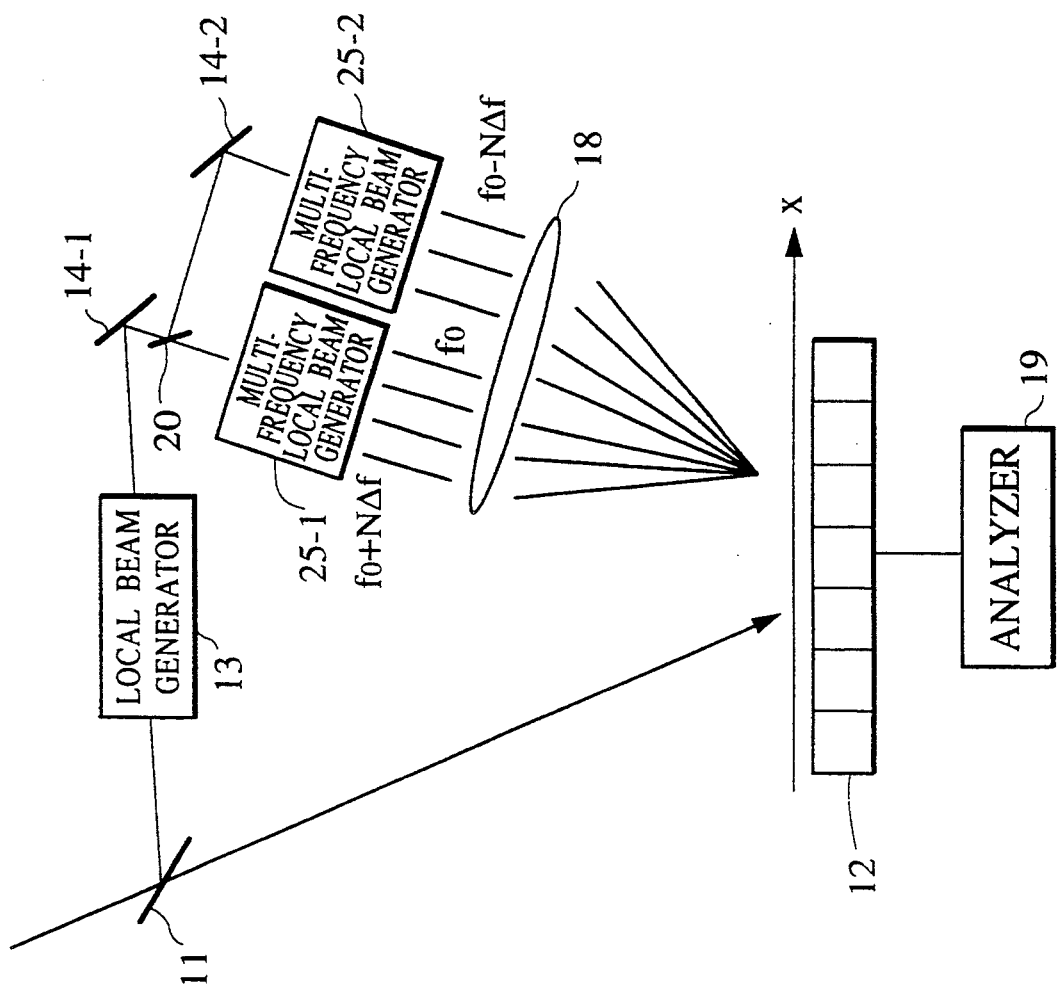
FIG. 9 is a block diagram of a modified configuration for the optical receiver of FIG. 6.

For this reason, in order to make it possible to deal with both of these modulation schemes, the optical receiver of this second embodiment can be modified as shown in FIG. 9, which includes two multi-frequency local beam generators 25-1 and 25-2 for generating the local beams with the frequencies $f_0$ to $f_0+N\Delta f$ and the frequencies $f_0-\Delta f$ to $f_0-N\Delta f$, respectively, where the multi-frequency local beam generator 25-2 has the acousto-optic deflector in which the acoustic waves are propagated in the directed opposite to that in which the acoustic waves are propagated in the acousto-optic deflector of the multi-frequency local beam generator 25-1. All of the multi-frequency local beams generated by the multi-frequency local beam generators 25-1 and 25-2 are focused onto the photo-detector element array 12 together by the lens 18.

Accordingly, in this modified configuration of FIG. 9, the mirror 14 to reflect the local beam from the local beam generator 13 is replaced by a combination of mirrors 14-1 and 14-2 and a half mirror 20 for parallelly entering the local beam generated by the local beam generator 13 into both of the multi-frequency local beam generators 25-1 and 25-2. The rest of this modified configuration of FIG. 9 is substantially equivalent to that of FIG. 6.

It is also to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical receiver for receiving an optical signal carrying data within a finite temporal length T, comprising:
   input means for entering the optical signal;
   local beam generation means for generating a local beam synchronized with a carrier of the optical signal entered by the input means;
   local beam processing means for obtaining multifrequency local beam components from the local beam generated by the local beam generation means and spatially resolving the multi-frequency local beam components to obtain spatially resolved beams with mutually different frequencies;
   photo-detector means for receiving the optical signal entered by the input means and the spatially resolved beams obtained by the local beam processing means simultaneously to obtain an interference fringe pattern; and
   analyzer means for reconstructing the optical signal by Fourier analyzing the interference fringe pattern obtained by the photo-detector means.

2. The optical receiver of claim 1, wherein the local beam processing means includes:
   modulation means for modulating the local beam generated by the local beam generation means to obtain the multi-frequency local beam components; and
   optical frequency filter means for spatially resolving the multi-frequency local beam components obtained by the modulation means to obtain the spatially resolved beams with mutually different frequencies.

3. The optical receiver of claim 2, wherein the modulation means modulates the local beam by using a prescribed reference frequency $\Delta f$ equal to $1/T$, such that the optical frequency filter means obtains the spatially resolved beams with frequencies mutually differing at intervals of $\Delta f$.

4. The optical receiver of claim 1, wherein the local beam processing means includes:
   acousto-optic deflector for shifting a frequency of an input beam entered at an incident angle by a prescribed amount, and outputting an output beam with a shifted frequency at an output angle in which a prescribed deflection angle is added to The incident angle, to which the local beam generated by the local beam generation means is entered as the input beam initially; and
   optical system forming a beam path circulating from an output side to an input side of the acousto-optic deflector for the output beam outputted by the acousto-optic deflector, to which a part of the output beam circulated through the beam path is entered as a new input beam at a sequentially shifted incident angle, while a remaining part of the output beam circulated through the beam path is outputted to the photo-detector means as one of the spatially resolved beams.

5. The optical receiver of claim 4, wherein the acoustooptic deflector shifts the frequency of the input beam by a prescribed reference frequency $\Delta f$ equal to $1/T$, such that the optical system outputs the spatially resolved beams with frequencies mutually differing at intervals of $\Delta f$.

6. The optical receiver of claim 1, wherein the local beam processing means includes:
   first local beam processing means for obtaining the spatially resolved beams with mutually different frequencies lower than a frequency of the local beam generated by the local beam generation means; and
   second local beam processing means for obtaining the spatially resolved beams with mutually different frequencies higher than the frequency of the local beam generated by the local beam generation means.

7. The optical receiver of claim 1, wherein the optical signal entered by the input means is given in forms of optical cells or optical packets.

8. The optical receiver of claim 1, wherein the optical signal entered by the input means is modulated in advance by either an amplitude modulation or a phase modulation.

9. A method of optical reception for receiving an optical signal carrying data within a finite temporal length T, comprising the steps of:
   (a) entering the optical signal;
   (b) generating a local beam synchronized with a carrier of the optical signal;
   (c) obtaining multi-frequency local beam components from the local beam generated at the step (b) and spatially resolving the multi-frequency local beam components to obtain spatially resolved beams with mutually different frequencies;
   (d) receiving the optical signal entered at the step (a) and the spatially resolved beams obtained at the step (c) simultaneously at photo-detector means to obtain an interference fringe pattern; and
   (e) reconstructing the optical signal by Fourier analyzing the interference fringe pattern obtained by the photodetector means at the step (d).

10. The method of claim 9, wherein the step (c) includes the steps of:
   (c1) modulating the local beam generated at the step (b) to obtain the multi-frequency local beam components; and (c2) spatially resolving the multi-frequency local beam components obtained at the step (c1) by optical frequency filter means to obtain the spatially resolved beams with mutually different frequencies.

11. The method of claim 10, wherein the local beam is modulated at the step (c1) by using a prescribed reference frequency Δf equal to 1/T, such that the optical frequency filter means obtains the spatially resolved beams with frequencies mutually differing at intervals of Δf at the step (c2).

12. The method of claim 9, wherein the step (c) includes the steps of:
(c1) shifting a frequency of an input beam entered at an incident angle by a prescribed amount, and outputting an output beam with a shifted frequency at an output angle in which a prescribed deflection angle is added to the incident angle by an acousto-optic deflector, to which the local beam generated at the step (b) is entered as the input beam initially; and
(c2) forming a beam path circulating from an output side to an input side of the acousto-optic deflector for the output beam outputted by the acousto-optic deflector, to which a part of the output beam circulated through the beam path is entered as a new input beam at a sequentially shifted incident angle, while a remaining part of the output beam circulated through the beam path is outputted to the photo-detector means as one of the spatially resolved beams.

13. The method of claim 12, wherein the acousto-optic deflector shifts the frequency of the input beam by a prescribed reference frequency Δf equal to 1/T at the step (c1), such that the spatially resolved beams with frequencies mutually differing at intervals of Δf are outputted at the step (c2).

14. The method of claim 9, wherein the step (c) includes the steps of:
(c1) obtaining the spatially resolved beams with mutually different frequencies lower than a frequency of the local beam generated at the step (b); and
(c2) obtaining the spatially resolved beams with mutually different frequencies higher than the frequency of the local beam generated at the step (b).

15. The method of claim 9, wherein the optical signal entered at the step (a) is given in forms of optical cells or optical packets.

16. The method of claim 9, wherein the optical signal entered at the step (a) is modulated in advance by either an amplitude modulation or a phase modulation.

* * * * *